June 6, 1967 A. E. HALL 3,323,667
EXTENSIBLE TIRE CARRIER
Filed Oct. 22, 1965 4 Sheets-Sheet 2
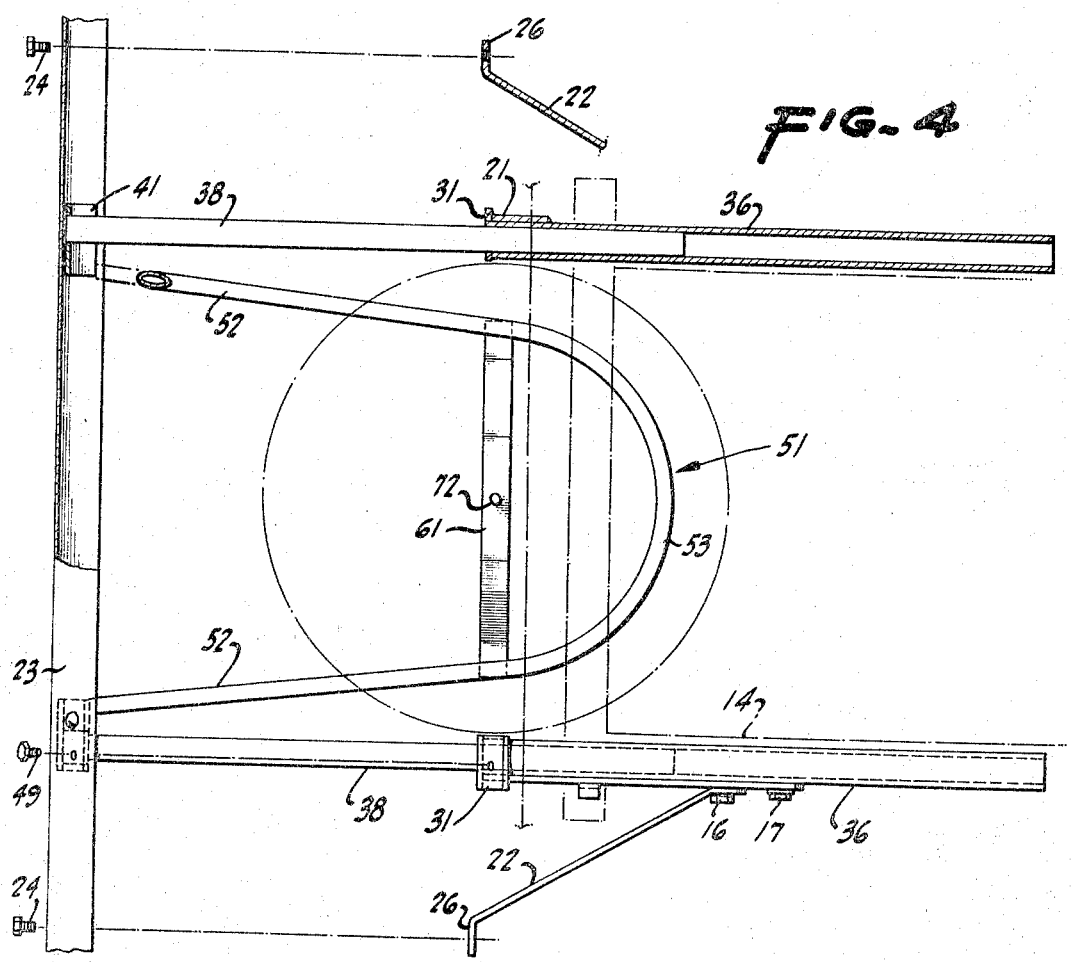
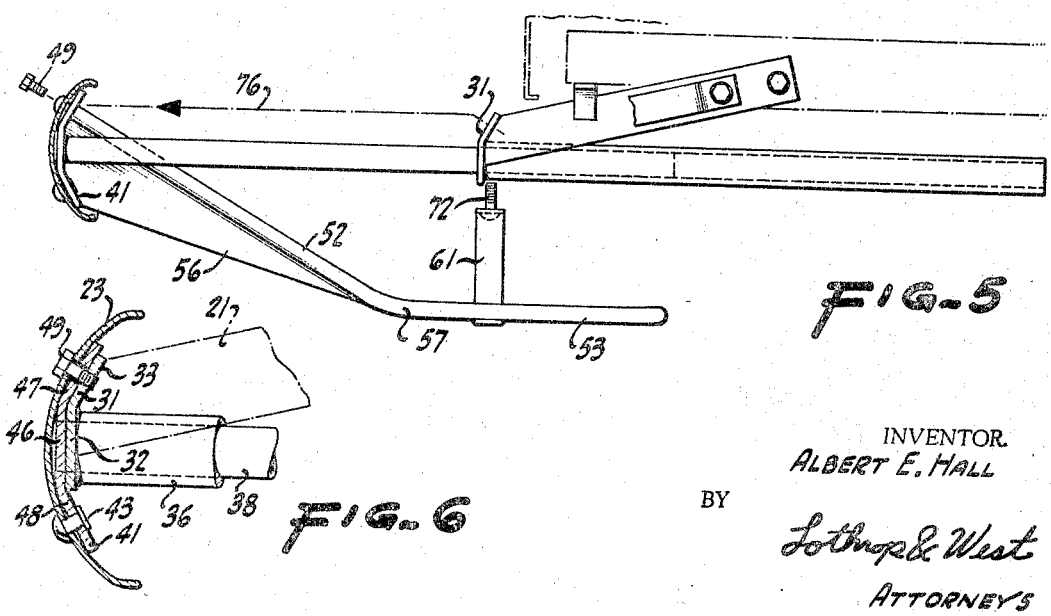
INVENTOR.
ALBERT E. HALL
BY
Lothrop & West
ATTORNEYS

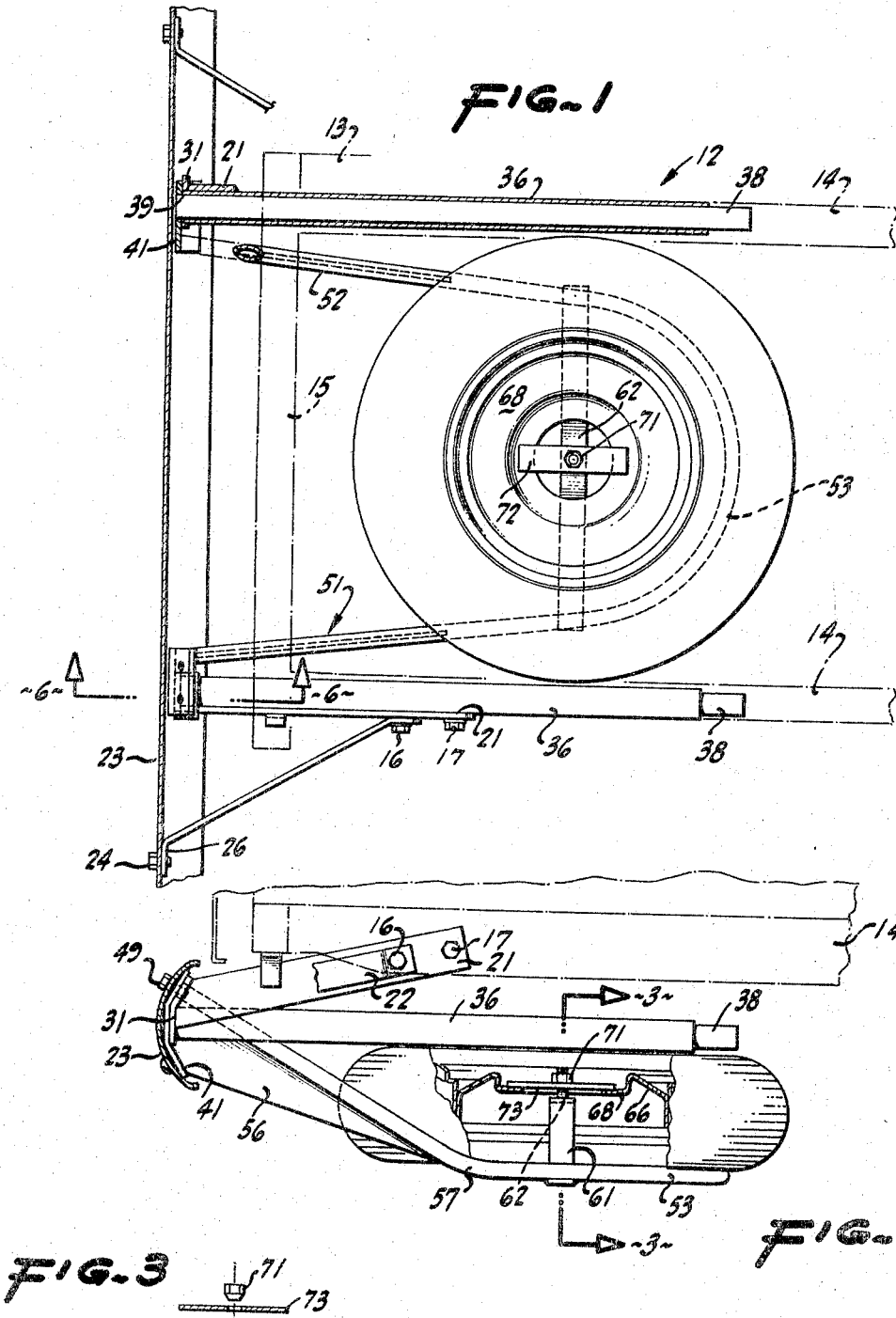

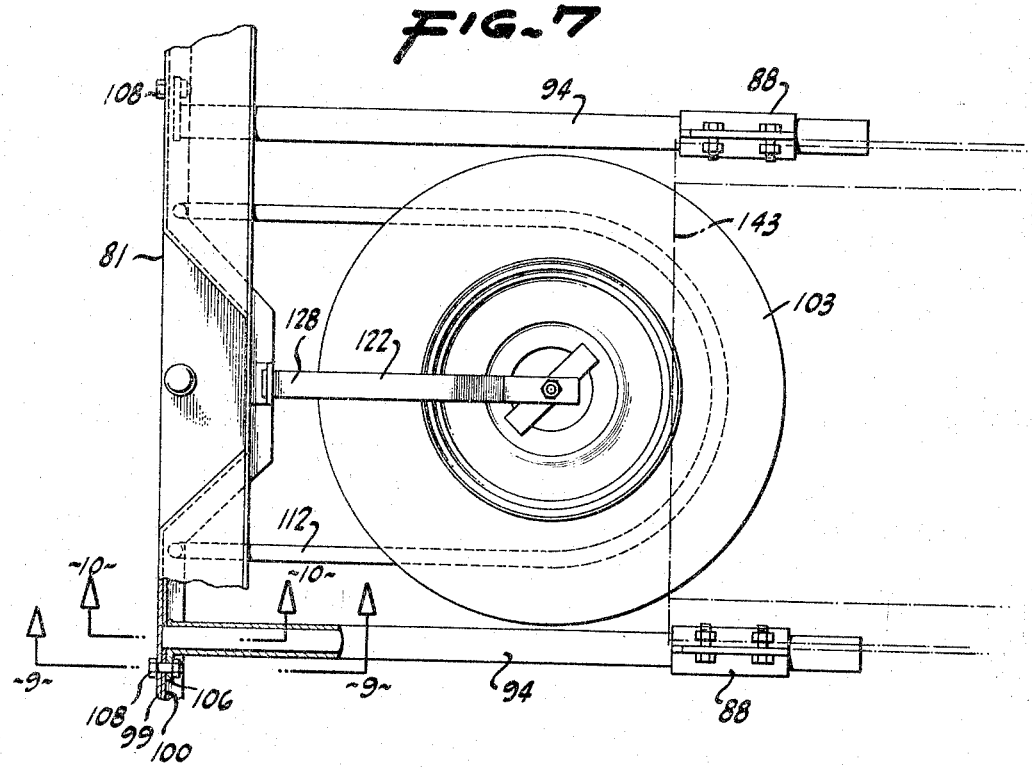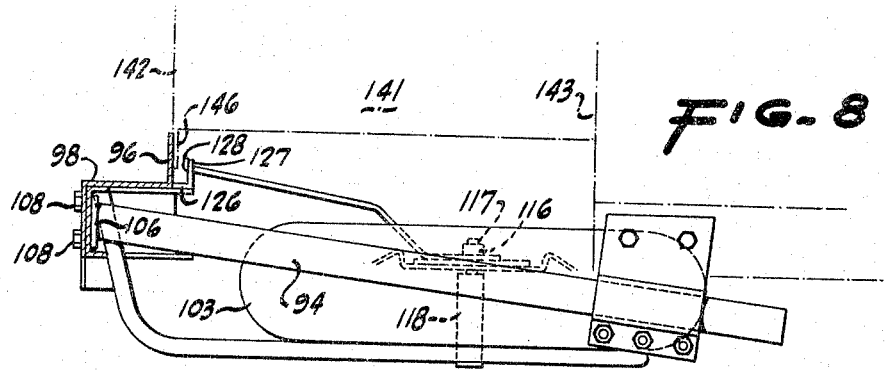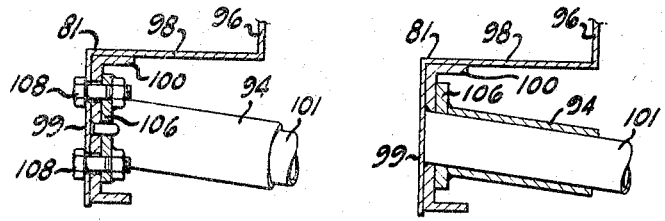

June 6, 1967 A. E. HALL 3,323,667
EXTENSIBLE TIRE CARRIER
Filed Oct. 22, 1965 4 Sheets-Sheet 4
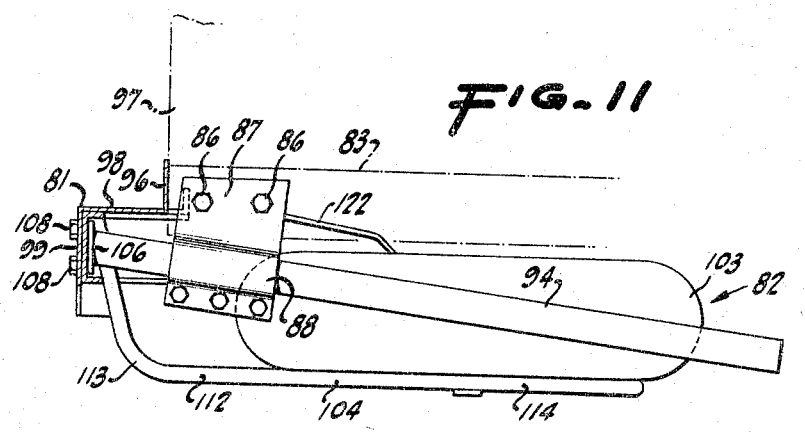
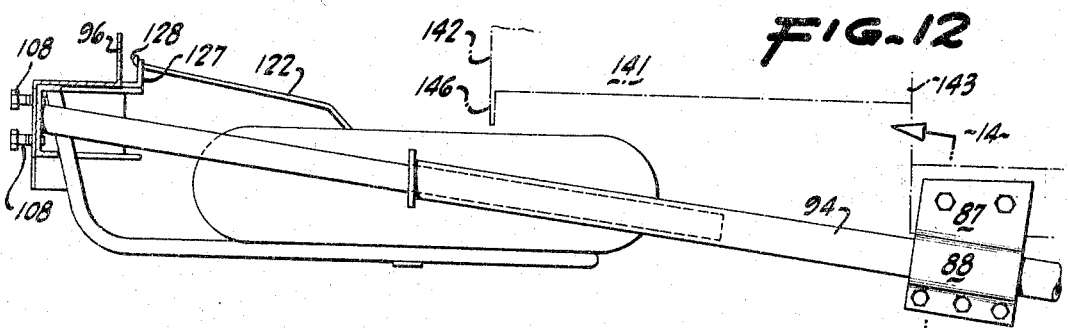
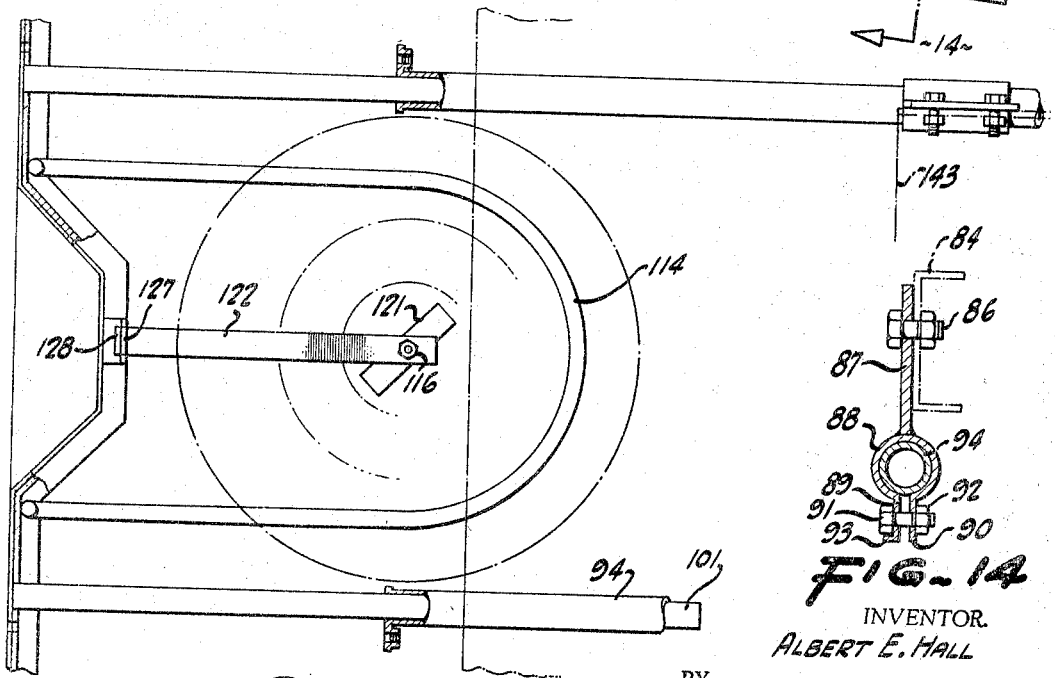
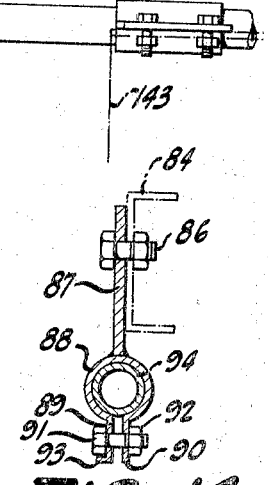
INVENTOR.
ALBERT E. HALL
BY
Lothrop & West
ATTORNEYS 3,323,667
EXTENSIBLE TIRE CARRIER
Albert E. Hall, 8885 Halvorson Drive,
Elk Grove, Calif. 95624
Filed Oct. 22, 1965, Ser. No. 501,149
5 Claims. (Cl. 214—454)

The invention relates generally to carriers for the spare tires of motor vehicles, and, more particularly to tire carriers which are slidable in a generally fore and aft direction between a forward position wherein the tire is hidden below the vehicle and a rearward position wherein the spare tire is exposed for removal and use.

While many types of motor vehicles afford a convenient arrangement for the storage of and access to a spare tire, such is not the case with other styles. Most pick-up trucks, for example, have failed to solve the problem in that such vehicles often mount the spare tire on the tailgate or inside the bed of the truck. In either case, the tire is subject to theft, malicious damage, and the deleterious effect of the sun's rays; and in the latter event, taking up needed bed space as well.

In other types, the spare tire is mounted on a fixed rack disposed underneath the truck bed. With this arrangement, the tire, the rack and the fastenings become covered with mud, either wet or dry and caked, thus rendering tire removal difficult. Furthermore, the location is often such that it becomes necessary to crawl under the vehicle to gain access to the fastenings and to remove the tire. This is not only dangerous at times, but is also highly uncomfortable, particularly where the road is snow-covered, muddy or strewn with sharp rocks.

It is therefore an object of the invention to provide an extensible tire carrier which provides convenient access to a spare tire.

It is another object of the invention to provide a tire carrier in which the spare tire is stored in a location which does not interfere with the space in a truck bed.

It is a further object of the invention to provide a tire carrier which affords a high degree of security and protection to the tire.

It is yet a further object of the invention to provide a tire carrier which readily lends itself to use either with a "factory" or with a "utility" type of bumper, and which is equally susceptible to ready installation either at the time of manufacture or at a later period.

It is still another object of the invention to provide an extensible tire carrier which uniquely lends itself to use with Camper bodies removably mounted on pickup trucks.

It is an additional object of the invention to provide a tire carrier which is, compact, durable and rugged, yet which is relatively economical.

It is another object of the invention to provide a generally improved extensible tire carrier.

Other objects, together with the foregoing, are attained in the embodiments described in the following description and shown in the accompanying drawings in which:

FIGURE 1 is a top plan view of one form of the tire carrier, portions being shown in section, and with other portions being broken away to reduce the extent of the figure;

FIGURE 2 is a fragmentary side elevational view of FIGURE 1, portions being shown in section;

FIGURE 3 is an exploded, sectional view of the tire hold-down structure, the plane of the section being indicated by the line 3—3 in FIGURE 2;

FIGURE 4 is a fragmentary, top plan view of the carrier of FIGURE 1, showing the movable portion of the structure in projected position;

FIGURE 5 is a fragmentary, side elevational view of FIGURE 4;

FIGURE 6 is a fragmentary, sectional view, to an enlarged scale, of the bumper mounting, the plane of the section being indicated by the lines 6—6 in FIGURE 1;

FIGURE 7 is a fragmentary, top plan view of a variant form of carrier with portions being shown in section;

FIGURE 8 is a side elevational view of FIGURE 7;

FIGURE 9 is a fragmentary sectional view to an enlarged scale, of the bumper mounting structure, the plane of the section being indicated by the line 9—9 in FIGURE 7;

FIGURE 10 is a view comparable to FIGURE 9 but with the plane of the section being indicated by the line 10—10 in FIGURE 7;

FIGURE 11 is a view comparable to that of FIGURE 8 but showing the carrier with the sleeves in forwardmost location;

FIGURE 12 is a view comparable to that of FIGURE 8, but showing the carrier with the sleeves in a rearward location and with the slide members in projected position;

FIGURE 13 is a fragmentary top elevational view of FIGURE 12; and,

FIGURE 14 is a fragmentary, sectional view, to an enlarged scale, of the clamping collar structure, the plane of the section being indicated by the line 14—14 in FIGURE 12.

While the extensible tire carrier of the invention is susceptible of numerous physical embodiments, depending on the environment and requirements of use, substantial numbers of the herein shown and described embodiments have been made, sold and used, and all have performed in an eminently satisfactroy manner.

The tire carrier of the invention, generally designated by the reference numeral 12, is mounted adjacent the after end of a motor vehicle, such as a pickup truck 13, provided with the customary, longitudinal channels 14 and a rear, transverse, cross-rail 15.

Secured to each of the longitudinal vehicle frame channels 14, as by appropriate fastenings 16 and 17, is an elongated, rearwardly and slightly downwardly extending mounting plate 21.

Since the carrier is substantially bilaterally symmetrical about a longitudinal, median, vertical plane, a description of the structure on one side will serve equally, except where noted, to describe the identical counterparts on the other side.

Also affixed to the channel 14, and to the mounting plate 21, by the fastening 16, is a rearwardly and laterally outwardly projecting bumper stiffening strut 22, or bracket, the after end of the bracket 22 being removably attached to the vehicle's rear bumper 23, as by a machine screw 24 extending through an opening in the bumper and threadedly engaging a drilled and tapped hole in the bracket's lateral rear flange 26.

The bumper 23, as illustrated in FIGURES 1-6, is of the "factory" or arcuate-in-section type which is ordinarily provided with chrome plating and which is of the kind almost invariably found on passenger cars, but with an increasingly frequent use on many pickup trucks, as well. The word "factory" type is selected to distinguish it from the "utility" type of bumper illustrated in FIGURES 7-13 constructed from plate stock to form an especially sturdy, box-like configuration most frequently encountered on pickup trucks used in hard service and for towing.

The mounting plate 21 and the bracket 22 serve to support the entire tire carrier structure, including the bumper 23. Thus, the device can readily be mounted on a pickup truck either at the factory or at a later time, without the need for special equipment or highly skilled personnel.

Mounted transversely, as by welding, on the after end of the mounting bracket 21 is a stop plate 31, the stop plate being bent to a slight angular configuration (see FIGURE 6) to afford both a vertical portion 32 and a forwardly and upwardly inclined portion 33.

Mounted, in turn, on the forward face of the stop plate 31, is a forwardly extending, substantially horizontal, elongated sleeve 36. The hollow sleeve 36 can be formed to any desired cross-section, such as tubular or in the shape of a hollow square. It has been found, however, that the use of tubing effects certain economies in the construction of the sleeve 36, and the sleeve 36 is therefore illustrated as a tube herein (see FIGURE 6).

Translatably disposed within the sleeve 36 is a slide member 38 conforming with some clearance to the internal contours of the sleeve 36. In the embodiment shown, the slide member 38 is, accordingly, tubular or rod-like in cross-section.

As appears most clearly in the upper, or sectioned, portion of FIGURE 1, the after end of the slide member 38 projects rearwardly through an opening in and beyond the stop plate 31, and extends into a registering opening 39 in a backing plate 41, the after end fo the slide member 38 being secured to the backing plate 41 as by, welding, as appears most clearly in FIGURE 5.

As can be seen by especial reference to FIGURE 6, the backing plate 41 assumes a roughly arcuate configuration in cross section, and thus nests into the adjacent bumper concavity, the backing plate 41 being secured to the bumper 23, as by rivets 43. The roughly arcuate cross section of the backing plate 41 comprises, in fact, not a true arc, but rather, three angled portions including a central vertical portion 46, an upper and forwardly inclined segment 47, and a lower and forwardly angled portion 48 (see FIGURE 6).

The portions 46 and 47 of the backing plate 41, it will be noted, closely engage or nest with the corresponding angled portions 32 and 33 of the stop plate 31 when the bumper 23, the backing plate 41 and the slide member 38 are in fully forward, i.e. retracted, position as shown in FIGURES 1 and 2.

In this retracted position, the nested bumper, backing plate and stop plate are secured together, as by a machine screw 49 extending through registering openings in the bumper and the backing plate and into threaded engagement with the stop plate, which has a registering drilled and tapped hole therein (see FIGURE 6).

It can now readily be seen that the structure as heretofore described, and as shown, is extremely rugged and durable, with the arcuate configuration of the bumper as well as the generally arcuate cross-sections of the backing plate and the stop plate forming a unitary structure having high beam strength as well as resistance to stresses of a torsional nature. This effect is even more augmented by reason of the unitary transverse bumper secured adjacent its ends to the frame channels 14 by the rigid stiffening struts 22.

The stop plate 31, by nesting with the backing plate 41, also serves to center or align the backing plate and the bumper when the slidable portion of the carrier is urged forwardly into its retracted position, thus bringing the three openings into registry for the ready insertion and threading of the attaching screw 49.

Mounted on the forward side of the backing plate 41 and projecting forwardly in a roughly U-shaped configuration in plan, is a tire carrying cantilevered framework, generally designated by the reference numeral 51, the framework including a tubular pair of arms 52 merging adjacent their forward ends in an arcuate, substantially semi-circular portion 53.

In projecting forwardly from their mountings on the backing plate 41, the arms incline forwardly and downwardly, as appears most clearly in FIGURE 5, with this inclined portion of the cantilever being reinforced by triangular gussets 56. At the bottom of the inclined portion, the arms curve forwardly from an elbow 57 and assume a substantially horizontal attitude approximately throughout the forward, arcuate portion 53.

Spanning the horizontal portion of the framework and secured thereto, as by welding (see FIGURE 3), is a wheel supporting bracket 61 assuming roughly, in cross-section the shape of an inverted U. The horizontal portion 62 of the bracket 61 serves as a supporting rack for the wheel 66 having a tire 67 mounted thereon (see FIGURE 2). In other words, the wheel disk, or web, portion 68 is superimposed on the bracket horizontal portion 62 and is clamped thereto by a nut 71 in threaded engagement with a vertical lug bolt 72 upstanding from the bracket portion 62 and an interposed spanner plate 73, or hold-down plate.

In order to gain access to the spare tire, normally located in the forward position shown in FIGURES 1 and 2, the two strut screws 24 and the two bumper screws 49 are first removed. Then, by grasping the bumper 23 and pulling rearwardly in the direction indicated by the arrow 76 (see FIGURE 5), the slide members 38 and attendant structure translate rearwardly. Rearward movement is continued until the wheel is exposed and the nut 71 is conveniently accessible. The nut 71 and the hold-down plate 73 are thereupon removed and the spare tire is withdrawn, for use. Tire replacement is effected by reversing the foregoing operation.

FIGURES 7–14 illustrate a variant form of the device, and is one which has been found to be especially suitable for use on pickup trucks having bumpers 81 of the "utility" type and more particularly with pickups of this variety with which Campers are utilized from time to time. As is well known, Campers is a term used to identify a relatively small, compact, living unit built for especial use on pickups.

Referring at this time to FIGURE 11, which illustrates the variant form of extensible tire carrier 82 mounted below the bed 83 of a pickup truck having a "utility" bumper 81 thereon, it will be noted that a longitudinal channel 84 of the truck has mounted thereon, by a suitable pair of fasteners 86, a vertical flange portion 87 of a clamping collar 88.

The clamping collar 88 is split along its bottom length (see FIGURE 14) and a pair of spaced plates 89 and 90 depending from each lower collar portion is urged into collar clamping relationship by a plurality of bolts 91 and nuts 92.

It will be noted, as a matter of interest, that the lowermost edge 93 of the depending plate 89 is bent laterally outwardly to form a flange closely underlying a flat portion of the head of the bolt 91, as a consequence of which the nut 92 can be turned by a wrench without the necessity of holding the bolt head 91 with a separate wrench. In other words, the lateral flange 93 serves to prevent rotation of the bolt as the nut 92 is turned.

Disposed within the collar is an elongated sleeve 94, preferably formed from a tube of annular cross-section, the sleeve 94 being securely clamped in the collar, as previously explained, at a predetermined location depending upon the environment.

In FIGURE 11, the sleeve 94 is located in its forwardmost position, with the forward vertical plate 96 of the bumper in substantial vertical alignment with the tailgate 97 of the truck. In this situation, the horizontal top plate 98 of the bumper affords a convenient step to persons climbing up on or stepping down from the truck bed 83.

Mounted on and depending vertically from the after end of the step 98 is a rear plate 99 of the bumper 81; and located forwardly of the rear plate 99 and in face to face engagement therewith is a strong channel member 100 (see FIGURES 9 and 10).

Connected to the rear bumper plate 99 and the transverse channel 100, as by welding (see FIGURE 10) is a slide member 101, such as a tube, translatably disposed within the sleeve 94.

Relative sliding movement between the sleeve 94, or outer tube, and the sliding member 101, or inner tube, is possible so long as the sleeve 94 is not secured to the rear plate 99 and the channel 100. However, during normal storage of the spare tire 103 on the tire storage rack 104, a flange 106 on the aftermost end of the sleeve 94 is detachably affixed to the bumper rear plate 99 and the channel 100 by appropriate fasteners 108.

The tire supporting framework 104 is similar in many respects to that previously described in connection with the FIGURE 1 through 6 form of device, and includes a pair of arms 112 mounted at their after ends on the bumper channel, the arms extending first downwardly, then bending forwardly at an elbow 113 and extending horizontally ahead to merge in a forward arcuate portion 114. The cantilevered arms 112 support the spare tire 103; and the wheel is firmly, although detachably, secured, as before, by a nut 116 engaged with a vertical lug bolt 117 upstanding from an inverted U-shaped cross bracket 118 secured at its opposite ends to the arms 112 (see FIGURE 8).

Interposed between the nut 116 and the bracket is a hold-down plate 121, or spanner plate, and a retainer strap 122, or tire keeper. The tire keeper is clamped at its forward end by the nut 116 and pivotally mounted at its after end on a central forward extension plate 126 of the utility bumper. The aftermost end of the strap 122 is recurved upwardly to form a lug 128. The lug projects snugly through an opening in the vertical front wall 127 of the bumper forward extension 126 and binds against the rear face of the wall 127 during the time the forward end of the strap is held in place by the nut 116. After the nut 116 is removed, however, the retainer strap can be angularly swung upwardly and rearwardly about the lug 128 as a pivot, followed, if desired by disengaging the strap entirely by withdrawing the lug through its corresponding opening in the wall 127.

Reference is now particularly had to FIGURES 7 and 8 and 12 and 13, which illustrate the relocation of the elongated sleeves 94 relative to the clamping collars 88 in order to adapt the device to the additional rearward and somewhat elevated overhang occasioned by the placing of Camper projects rearwardly a foot, or often more, beyond In other words, the rear end 142 of the conventional camper projects rearwardly a foot, or often more, beyond the rear end 143 of the truck bed on which the Camper is supported. The ability to shift the extensible carrier rearwardly enables it to be adapted for use with Campers.

The rear end 142 of many Campers is provided with a depending panel 146 (see FIGURES 8 and 12), or drip rail, which provides a convenient abutment and limit stop for the bumper forward wall 96, the central portion of the panel 146 being cut out, if necessary to pass the central, forward, bumper extension wall 127.

In other words, by temporarily loosening the clamping collar 88 and extending the sleeves rearwardly far enough so that the forward bumper wall 96 abuts against the after end 142 of the Camper body (see FIGURE 8), and re-clamping the collar 88, the horizontal portion 98 of the bumper 81 provides a convenient step for persons entering and leaving the rear door (not shown) found in most Campers.

Thereafter, should a flat tire occur, it is only necessary to remove the bolts 108 securing the movable portions of the device to the after ends of the fixed sleeves 94. This is followed by urging the bumper rearwardly, and withdrawing the slide members 101 from the sleeves 94 far enough clearly to expose the tire mounting rack and thus gain access to the spare tire.

It will further be noted, as an important feature, that the clamping collars 88 are inclined rearwardly and upwardly at an angle of approximately 7°. By so tilting the collars, the sleeves are similarly inclined. Consequently, when the clamping collars are loosened and the sleeves 94 are rearwardly extended so that the bumper wall 96 is in vertical alignment with the after end 142 of the Camper body, the bumper 81 is simultaneously elevated, and in fact is raised far enough to close the gap between the top of the bumper wall 96 and the drip rail 146.

After the Camper is removed from the truck the collars 88 are loosened and the sleeves moved forwardly into the FIGURE 11 position with the top of the bumper wall 96 now lowered far enough to be at approximately the height of the truck bed 83 and with the bumper wall 96 in vertical alignment with the truck's tail gate (see FIGURE 11).

It can therefore be seen that I have provided a tire carrier which is not only convenient in providing ready access to a spare tire but which is also versatile and flexible in operation in that it can be adjusted to meet a wide variety of circumstances.

What is claimed is:

1. An extensible tire carrier comprising:
    (a) a pair of fore and aft elongated mounting plates each secured to a longitudinal channel of a motor vehicle, said mounting plates projecting rearwardly beyond the body of the vehicle;
    (b) a pair of transverse stop plates mounted on the after end of said mounting plates;
    (c) a pair of substantially horizontal, fore and aft sleeves mounted at their after end on said stop plates, said stop plates having openings therein in registry with the bores of said sleeves;
    (d) a pair of slide members translatably disposed within said sleeves for fore and aft movement relative thereto between a first retracted position and a second projected position;
    (e) a pair of transverse backing plates mounted on the after ends of said slide members;
    (f) a motor vehicle bumper mounted on said backing plates for fore and aft movement with said slide members between said retracted position and said projected position;
    (g) a tire rack mounted at its after end on said backing plates, said rack including a framework extending downwardly and forwardly to receive a vehicle tire, and including means for removably securing the tire on said framework at an elevation below said longitudinal channels, said rack being movable with said backing plate, said bumper and said slide members between said retracted and said projected positions for the storage of a vehicle tire on said framework; and,
    (h) a pair of removable fasteners engageable with said bumper, said backing plates and registering openings in said stop plates as said backing plates are disposed in face to face engagement with said stop plates in said retracted position of said slide members.

2. The device of claim 1 further characterized by a pair of angular strut members secured at their forward ends to said longitudinal channels, the after ends of said strut members being in face to face engagement with said bumper in said retracted position thereof, and means for detachably securing said bumper to said after ends of said strut members in said retracted position of said bumper.

3. An extensible tire carrier for use on a motor vehicle having a pair of longitudinal frame channels, said carrier comprising:
    (a) a pair of generally fore and aft sleeves mounted on the channels;
    (b) a pair of slide members translatably disposed within said sleeves for movement between a forward retracted position and an after projected position;
    (c) a vehicle bumper mounted on the after ends of said slide members, said bumper being movable with said slide members between said projected position spaced rearwardly from said sleeves and said retracted position in abutment with said sleeves, said bumper being detachably secured to said sleeves in said retracted position; and, (d) a tire rack mounted on said bumper, said tire rack extending forwardly therefrom to afford a cantilevered tire supporting platform movable with said bumper and said slide members between said retracted position and said projected position wherein said platform is exposed.

4. The device of claim 3 further including means for selectively positioning said sleeves in a fore and aft location relative to the channels.

5. The device of claim 4 wherein said positioning means includes a pair of sleeve securing members mounted on the channels, and wherein the fore and aft axes of said sleeve securing members are inclined rearwardly and upwardly to effect upward movement of said bumper as said slide members are translated from said retracted position toward said projected position and a downward movement of said bumper as said slide members are moved from said projected position toward said retracted position.

References Cited

UNITED STATES PATENTS

| 2,080,989 | 5/1937 | Smith | 214—454 |
| 2,274,440 | 2/1942 | Tozier | 214—454 X |

FOREIGN PATENTS

| 39,864 | 12/1931 | France. |
| 636,257 | 4/1950 | Great Britain. |

HUGO O. SCHULZ, *Primary Examiner.*